United States Patent
Katou et al.

[11] Patent Number: 5,962,039
[45] Date of Patent: Oct. 5, 1999

[54] SIMULTANEOUS FILLING BLOW MOLDING APPARATUS

[75] Inventors: Takaaki Katou; Masayuki Kishi, both of Yokohama, Japan

[73] Assignee: The Japan Steel Works, Ltd., Tokyo, Japan

[21] Appl. No.: 08/803,752

[22] Filed: Feb. 21, 1997

[51] Int. Cl.[6] .............. B29C 49/04; B29C 49/42; B29C 49/50; B29C 49/56

[52] U.S. Cl. .............. 425/210; 222/109; 222/214; 264/525; 425/524; 425/531; 425/532; 425/541

[58] Field of Search .............. 425/524, 531; 264/525; 429/73, 210, 532, 541; 53/561; 454/67; 222/571, 108, 109, 207, 214

[56] References Cited

U.S. PATENT DOCUMENTS

| | | | |
|---|---|---|---|
| 2,790,994 | 5/1957 | Cardot et al. | 264/525 |
| 3,460,198 | 8/1969 | Dietz et al. | 425/531 |
| 3,597,516 | 8/1971 | Harwood | 264/525 |
| 3,814,783 | 6/1974 | Dardaine et al. | 425/527 |
| 3,895,748 | 7/1975 | Klingenberg | 222/571 |
| 3,896,200 | 7/1975 | Wiley et al. | 425/531 |
| 3,919,374 | 11/1975 | Komendowski | 264/525 |
| 3,982,724 | 9/1976 | Citrin | 222/511 |
| 4,030,640 | 6/1977 | Citrin et al. | 222/214 |
| 4,095,722 | 6/1978 | Miller | 222/214 |
| 4,264,020 | 4/1981 | Loiseau | 222/214 |
| 4,403,764 | 9/1983 | Repplinger | 222/571 |
| 4,516,702 | 5/1985 | Schmidt | 222/571 |
| 4,671,762 | 6/1987 | Weiler et al. | 264/525 |
| 4,671,763 | 6/1987 | Weiler | 425/532 |
| 4,880,581 | 11/1989 | Dastoli et al. | 264/525 |
| 4,967,940 | 11/1990 | Blette et al. | 222/214 |
| 5,033,656 | 7/1991 | Blette et al. | 222/214 |
| 5,035,350 | 7/1991 | Blette et al. | 222/214 |
| 5,458,275 | 10/1995 | Centea et al. | 222/309 |
| 5,467,899 | 11/1995 | Miller | 222/309 |
| 5,478,229 | 12/1995 | Kato et al. | 425/531 |
| 5,700,498 | 12/1997 | Renzo et al. | 425/73 |
| 5,759,218 | 6/1998 | Martin et al. | 425/534 |

FOREIGN PATENT DOCUMENTS

| | | |
|---|---|---|
| 506646 A1 | 9/1992 | European Pat. Off. . |
| 2162115 | 6/1973 | Germany . |
| 1379891 | 1/1975 | United Kingdom . |

*Primary Examiner*—Robert Davis
*Attorney, Agent, or Firm*—Oblon, Spivak, McClelland, Maier & Neustadt, P.C.

[57] ABSTRACT

A cross head mounted at an end portion of an extruder for extruding a parison between a pair of elements of a metallic mold and a filling nozzle lifting apparatus having a filling nozzle are provided in parallel, and opening and closing of the metallic mold by a mold clamping apparatus, back and forth movement of the mold clamping apparatus between a parison receiving position and a filling position by a metallic mold feeding apparatus, upward and downward movement of the filling nozzle and back and forth movement of a parison cutter of a parison cutting apparatus are electrically operated. Further, a metallic mold body of the metallic mold is formed from a ventilation material, through which air in the metallic mold is sucked by vacuum to expand the parison. Furthermore, a clean air box is constructed so that it can accommodate the filling nozzle, and clean air is jetted from a jetting hole provided in a lower wall of the clean air box so that a clean air atmosphere may be provided above the metallic mold.

5 Claims, 12 Drawing Sheets

SIMULTANEOUS FILLING BLOW MOLDING APPARATUS

BACKGROUND OF THE INVENTION

1. Field of the Invention

This invention relates to a simultaneous filling blow molding method and apparatus, and more particularly to a simultaneous filling blow molding method and apparatus which prevents pollution to a molded article arising from invasion of foreign substances and eliminates germs from the molded article.

2. Description of the Related Art

When a medicine or food is filled into a hollow article molded by a blow molding apparatus, prevention of pollution to and elimination of germs from the inside of the hollow article must be achieved. One of conventionally known blow molding methods and apparatus of the type mentioned is disclosed, for example, in Japanese Patent Publication Application No. Heisei 7-35089 and is described below with reference to FIGS. 1 to 4.

Figure 1:
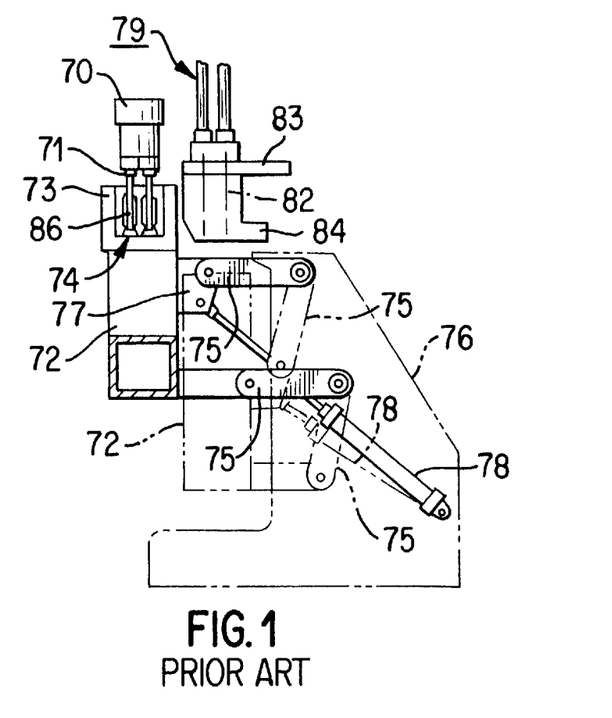
FIG. 1 is a view showing a conventional blow molding apparatus.

As shown in FIG. 1, a parison molding nozzle 71 which opens downwardly is provided on a cross head 70 attached to an end portion of an extruder (not shown). A metallic mold 74 held on a movable frame 72 by means of a holding plate 73 is opened and closed by a driving cylinder (not shown) incorporated in the movable frame 72. The movable frame 72 is supported on a frame 76 by means of a pair of link arms 75. A connection block 77 is provided projectingly on the rear face of the movable frame 72, and a driving cylinder 78 is disposed between the connection block 77 and the frame 76. As the driving cylinder 78 is expanded and contracted, the movable frame 72 can be moved back and forth between a parison receiving position (solid line in FIG. 1) in which the metallic mold 74 is positioned just below the cross head 70 and a blow position (imaginary line in FIG. 1) in which the metal mold 74 is positioned just below blow cylinders 79 which will be hereinafter described.

Figure 2:
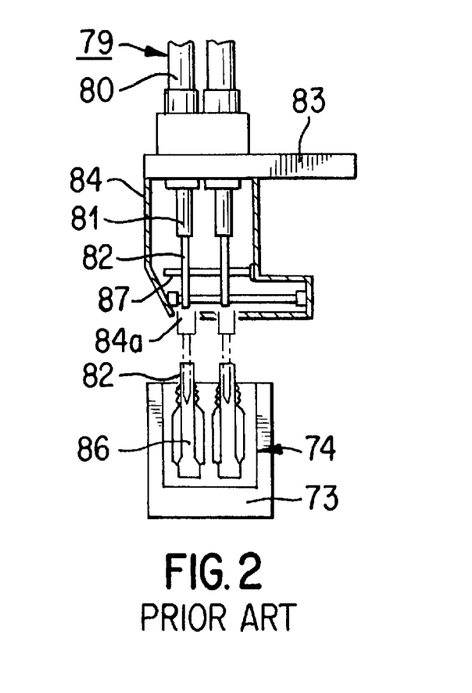
FIG. 2 is an enlarged view illustrating upwardly and downwardly moved conditions of an air mandrel shown in FIG. 1.

As seen from FIG. 2, each of the blow cylinders 79 is formed from a fixed casing 80 and a movable rod 81, and an air mandrel 82 is connected to an end of the rod 81. The blow cylinder 79 can drive the rod 81 and the air mandrel 82 upwardly and downwardly by an air pressure or a hydraulic pressure, and the air mandrel 82 can jet clean air from an end thereof when an air source is connected to the air mandrel 82. An accommodating case 84 is mounted on the lower face of a horizontal base 83 to which the blow cylinders 79 are attached. The accommodating case 84 has a fully enclosed structure except that it has, in a bottom wall thereof, round holes 84a for passing the rods 81 and the air mandrels 82 therethrough. Air pipes 87 for supplying clean air are accommodated in the accommodating case 84, and the accommodating case 84 is normally filled with clean air. It is to be noted that the accommodating case 84 can accommodate the entire of the air mandrels 82 when the air mandrels 82 are moved upwardly.

Figure 3:
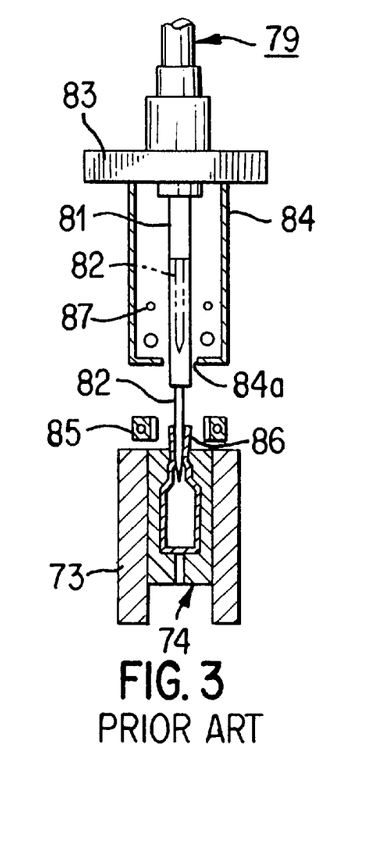
FIG. 3 is a vertical sectional view of the air mandrel of FIG. 2.

As shown in FIG. 3, seal dies 85 are provided between the lower face of the accommodating case 84 and the upper face of the metallic mold 74 and are opened or closed by a cylinder not shown to seal an upper end portion of a parison.

Operation of the blow molding apparatus is described below.

Figure 4:
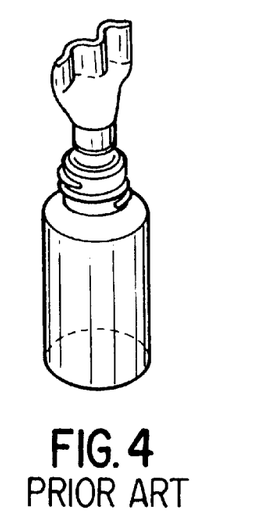
FIG. 4 is a perspective view of an entire conventional hollow article.

When parisons 86 are extruded to a fixed length from the parison molding nozzles 71, the metallic mold 74 is closed, and the parisons 86 are cut by cutter apparatus not shown provided on the cross head 70. Then, the movable frame 72 is moved to the blow position. Then, if the blow cylinders 79 are expanded there, then the ends of the blow cylinders 79 are inserted into the parisons 86 in the metallic mold 74 (imaginary line in FIG. 2), and therefore, the parisons 86 can be blow molded by blowing clean air into the parisons 86. It is to be noted that, as seen in FIG. 3, before the air mandrel 82 is moved upwardly, the seal dies 85 stand by at a position a little above the level of the upper face of the metallic mold 74 at which they hold the air mandrels 82 therebetween, and if the air mandrels 82 are moved upwardly, then the seal dies 85 are closed to mold and seal upper end portions of the parisons 86. Thereafter, if the metallic mold 74 is opened and the seal dies 85 are opened, then such hollow articles each having such a cap element as shown in FIG. 4 are discharged downwardly. By thereafter repeating similar operations, hollow articles can be produced successively. In the operations described above, the air mandrels 82 are cleaned by clean air supplied from the air pipes 87 while they remain accommodated in the accommodating case 84.

Since the blow molding method and apparatus described in the prior art is constructed in such a manner as described above, it has the following disadvantages.

(a) After a hollow article wherein an opening of a vessel body is temporarily closed up with a cap element is molded, it is transported to a filling apparatus provided separately. Then, by the filling apparatus, only the outside of the hollow article is sterilized and the upper end is unsealed, and then filling and sealing are performed. Where the blow molding apparatus and the filling apparatus are formed separately from each other in this manner, temporary sealing, unsealing, filling and capping steps are required to produce a filled up hollow article. Consequently, the process is complicated, and a sterilizing operation must be performed in each of the steps.

(b) In a process wherein the metallic mold is moved back and forth in an inclined direction between the parison receiving position just below the cross head and the blow position in which the metallic mold is positioned just below the blow cylinder, there is the possibility that some foreign substances may be admitted into the inside of the parison.

(c) Since the ends of the air mandrels are inserted into parisons in the metallic mold and air from the air source is blown into the parisons to blow mold the parisons, there is the possibility that some foreign substances may be admitted into the insides of the parisons from the air source or a pipe system.

(d) The risk that, if hydraulic operating fluid leaks from the driving cylinders, hydraulic units or the pipe system used for the movement of the metallic mold, for the opening and closing of the metallic mold or for the upward and downward movement of the air mandrels, then hollow articles may be polluted or mist of the hydraulic operating fluid may enter the insides of the parisons or otherwise the inner faces of the hollow articles may be polluted is always present. Particularly, if hydraulic operating fluid leaks from the driving cylinders for the air mandrels, then since hollow articles are present below the driving cylinders, there is the possibility that the hydraulic operating fluid may enter the hollow articles via the air mandrels.

(e) Where the cutter of each of the cutter apparatus for cutting a parison is an electrothermal hot cutter, there is the possibility that the parison (plastic) may be melted by the heated cutter until volatile gas or fine carbonized particles of the plastic are scattered into the air and the inside of the parison is polluted with them.

(f) Since a filling cylinder which sucks and discharges a fixed amount of liquid is usually used for filling of liquid by a filling apparatus, the liquid is likely to stay in the inside of the filling cylinder and so forth and cleaning or sterilization of it cannot be performed readily.

SUMMARY OF THE INVENTION

It is an object of the present invention to provide a simultaneous filling blow molding method and apparatus which can prevent invasion of germs or foreign substances into the inside of a hollow article molded by the blow molding apparatus when a medicine or food is filled into the vessel.

In order to attain the object described above, in a simultaneous filling blow molding method and apparatus according to the present invention, a cross head mounted at an end portion of an extruder for extruding a parison between a pair of elements of a metallic mold and a filling nozzle lifting apparatus having a filling nozzle are provided in parallel, and opening and closing of the metallic mold by a mold clamping apparatus, back and forth movement of the mold clamping apparatus between a parison receiving position and a filling position by a metallic mold feeding apparatus, upward and downward movement of the filling nozzle and back and forth movement of a parison cutter of a parison cutting apparatus are electrically operated. Further, a metallic mold body of the metallic mold is formed from a ventilation material, through which air in the metallic mold is sucked by vacuum to expand the parison. Furthermore, a clean air box is constructed so that it can accommodate the filling nozzle, and clean air is jetted from a jetting hole provided in a lower wall of the clean air box so that a clean air atmosphere may be provided above the metallic mold. In addition, a liquid filling apparatus is constructed with a pipe construction, and a fixed amount filling solenoid valve is provided to prevent staying of liquid in a liquid flow path.

By constructing the simultaneous filling blow molding apparatus in this manner, prevention of pollution to and elimination of germs from a molded article can be achieved.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Embodiments of the present invention are described below with reference to the drawings.

(First Embodiment)

Figure 5:
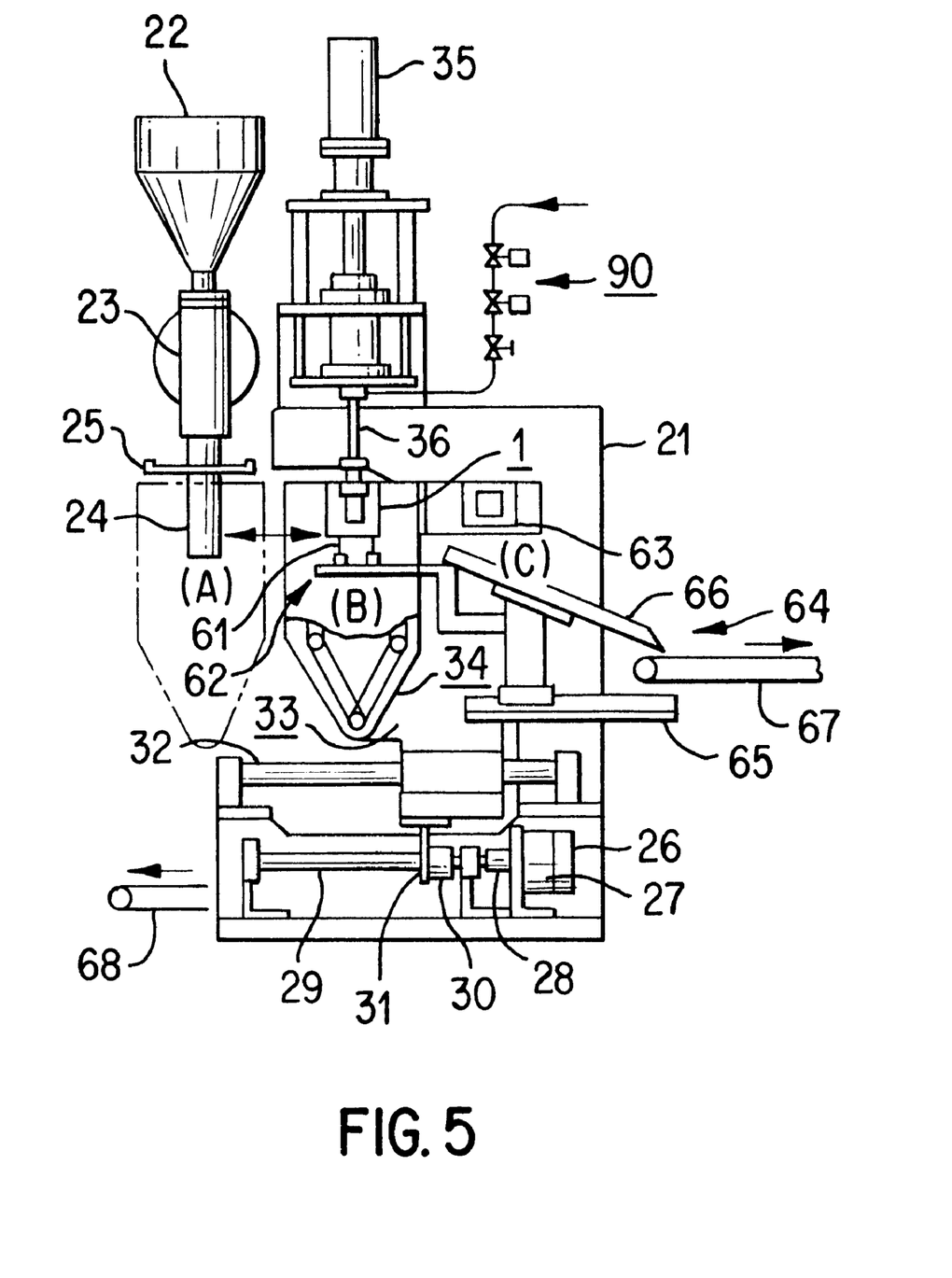
FIG. 5 is a schematic view showing a first embodiment of a simultaneous filling blow molding apparatus of the present invention.
Figure 6:
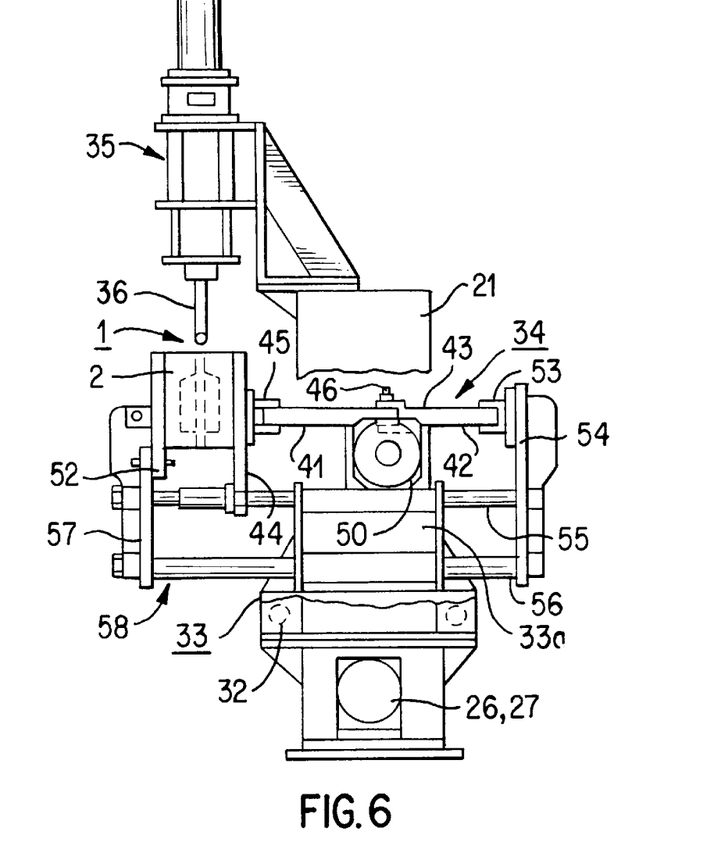
FIG. 6 is a side elevational view of the simultaneous filling blow molding apparatus of FIG. 5.

FIG. 5 is a schematic view showing a first embodiment of a simultaneous filling blow molding apparatus of the present invention, and FIG. 6 is a side elevational view of the simultaneous filling blow molding apparatus.

Referring to FIGS. 5 and 6, denoted by reference numeral 21 is a frame of a blow molding apparatus, and a filling nozzle lifting apparatus 35 having a filling nozzle 36 for filling liquid is placed at an upper portion of the frame 21. An extruder 22 and a cross head 23 connected to an end portion of the extruder 22 are located on the left side of the filling nozzle lifting apparatus 35 in FIG. 5. A parison cutting apparatus 25 for cutting a parison 24 extruded from the cross head 23 using a parison cutter is located just below the cross head 23. The parison cutting apparatus 25 is driven by a motor (not shown). A molded article supporting apparatus 62 having support pins 61 is located below the filling nozzle lifting apparatus 35.

An AC servomotor 27 having a rotary encoder 26 is provided at a lower portion of the frame 21. A ball screw 29 is connected for rotation to the AC servomotor 27 via a coupling 28, and a ball nut 30 is held in threaded engagement with the ball screw 29. A connection member 31 is secured to the ball nut 30, and a metallic mold feeding apparatus 33 fitted for movement on a guide bar 32 is disposed above the connection member 31. A mold clamping apparatus 34 for opening or closing a metallic mold 1 is mounted on the metallic mold feeding apparatus 33. In particular, the mold clamping apparatus 34 and the metallic mold 1 mounted on the metallic mold feeding apparatus 33 are movable back and forth between a filling position B indicated by solid lines in FIG. 5 and a parison receiving position A (indicated by imaginary in FIG. 5).

A molded article holding apparatus 63 which is moved back and forth between the filling position B and a molded article discharging position C by the back and forth movement of the mold clamping apparatus 34 is mounted on a side portion (right sight in FIG. 5) of the mold clamping apparatus 34.

A selecting apparatus 64 for selectively separating a molded article and burrs from each other is provided below the molded article holding apparatus 63 at the molded article discharging position C. In particular, the selecting apparatus 64 includes an inclined movable chute 66 provided just below the molded article holding apparatus 63 and movable back and forth in the leftward and rightward directions in FIG. 5 by an electric motor 65, a belt conveyor 67 provided at a lower location on the right side of the movable chute 66 for transporting a molded article, and another belt conveyor 68 provided below the molded article holding apparatus 63 for receiving and transporting burrs dropping thereto.

A liquid filling apparatus 90 is connected to the filling nozzle 36 of the filling nozzle lifting apparatus 35. It is to be noted that the liquid filling apparatus is described in detail in the description of Embodiment 3.

Figure 7:
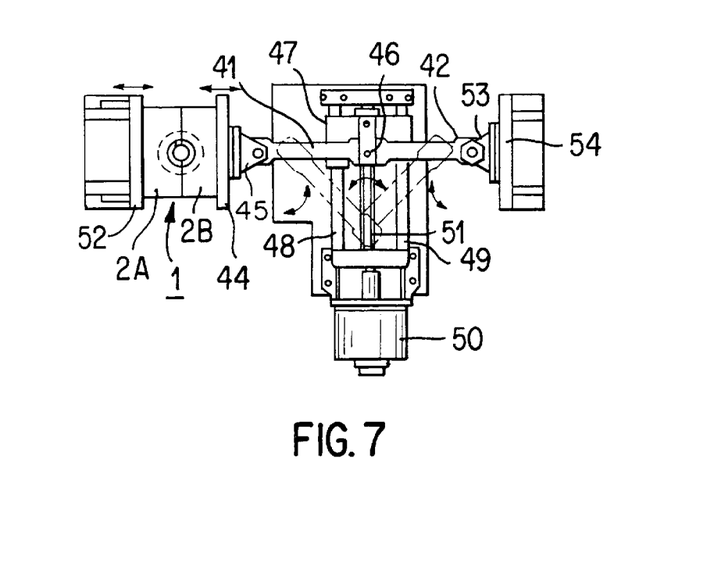
FIG. 7 is a plan view of a mold clamping apparatus shown in FIG. 6.

Next, the mold clamping apparatus 34 is described with reference to FIGS. 6 and 7.

A metallic mold body 2 of the metallic mold 1 is composed of a first metallic mold body 2A and a second metallic mold body 2B. The second metallic mold body 2B is connected to a toggle mechanism 43 formed from a pair of foldable first and second toggle members 41 and 42 via a second metallic mold holding member 44 and a clevis 45. A guide block 47 which holds a pivotally supporting portion 46 which connects the first and second toggle members 41 and 42 for folding movement to each other is guided by a pair of guide bars 48 and 49.

The guide block 47 is supported for back and forth movement in an axial direction by a feed screw member 51 such as a ball screw which is rotated by a servomotor 50. A first metallic mold holding member 52 is provided on the first metallic mold body 2A.

A pair of rods 55 and 56 are connected to a rear plate 54 which is connected to the second toggle member 42 by a clevis 53. The rods 55 and 56 are fixedly connected to a connection member 57 connected to the first metallic mold holding member 52, and the rod 55 extends for operation through the second metallic mold holding member 44. The rear plate 54, rods 55 and 56, and connection member 57 construct a metal mold opening and closing mechanism 58 for the metallic mold 1. A fixed table 33a having holes in which the rods 55 and 56 are fitted for sliding movement is securely mounted on the metallic mold feeding apparatus 33, and the servomotor 50 for operating the toggle mechanism 43 is provided at an upper portion of the fixed table 33a.

Accordingly, if the servomotor 50 in the construction described above is rendered operative to move the guide block 47 via the feed screw member 51, then the first and second toggle members 41 and 42 exhibit a linearly aligned condition or a folded condition along the positions (imaginary line in FIG. 7), respectively. When the first and second toggle members 41 and 42 exhibit a, linearly aligned condition, since the metallic mold holding members 44 and 52 are moved in mutually approaching directions by the metallic mold opening and closing mechanism 58, the metallic mold bodies 2A and 2B are put into a closed condition. But, when the toggle members 41 and 42 exhibit a folded condition, the metallic mold holding members 44 and 52 are moved in directions opposite to those described above and the metallic mold bodies 2A and 2B are put into an open condition.

While the mold clamping apparatus 34 employing the toggle mechanism 43 is described in detail above, the mold clamping apparatus may otherwise be constructed with a direct mechanism using a servomotor and a rotatable screw. Further, while the servomotor is employed in the foregoing description, some other electric motor including a step motor may be used instead.

Figure 8:
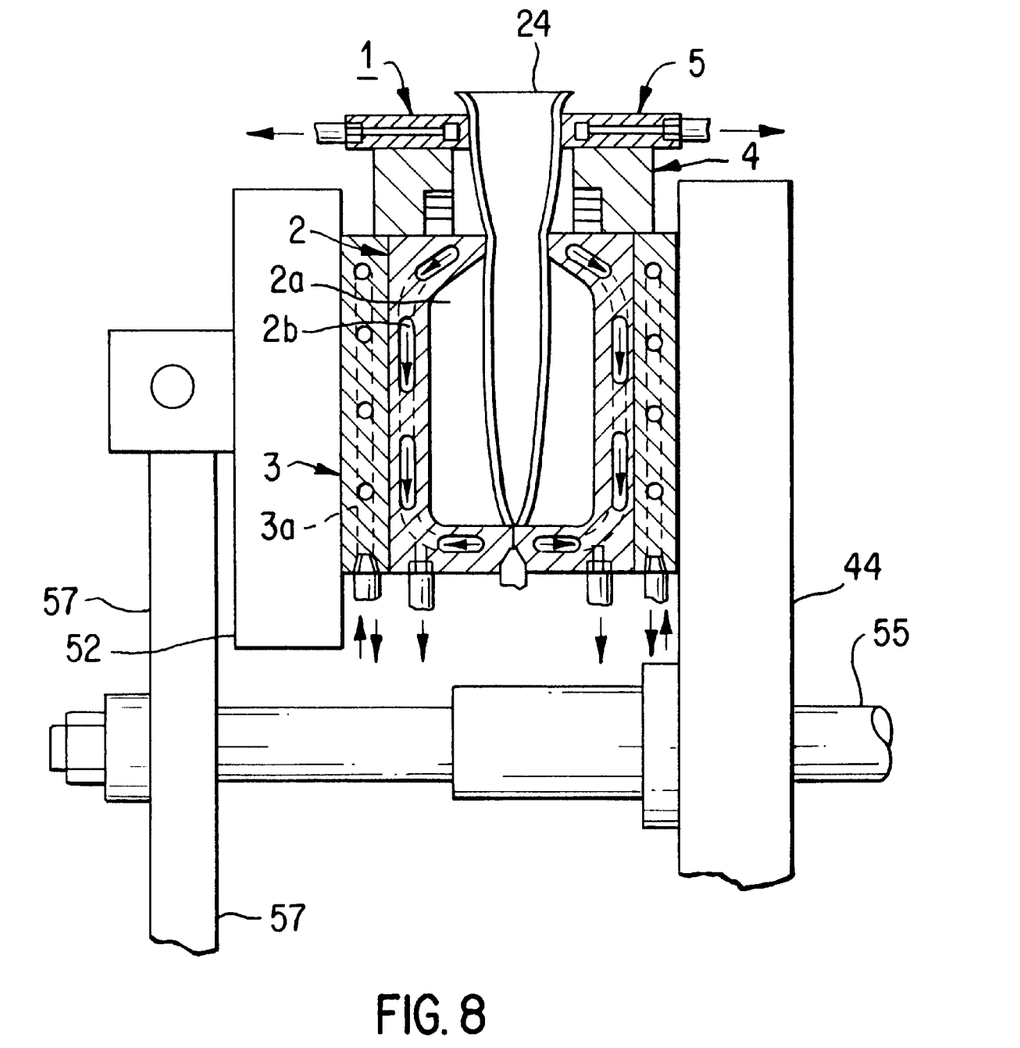
FIG. 8 is a sectional view of a metallic mold.

Next, the metallic mold 1 is described with reference to FIG. 8. The metallic mold 1 is composed of: the metallic mold body 2, a cooling member 3, a pressure sealing metallic mold 4 provided for sliding movement above the metallic mold body 2 and the cooling member 3, and a parison sucking plate 5 located above the pressure sealing metallic mold 4. In particular, the metallic mold body 2 is mounted on the metallic mold holding members 52 and 44 with the cooling member 3 interposed therebetween. The metallic mold body 2 is formed from a porous material serving as a ventilation member such as, for example, a sintered metal of stainless steel or a ceramic material, and a cavity 2a is formed on opposing faces of the two components of the metallic mold body 2. A suction jacket or suction hole serving as an air suction path 2b for sucking air from the cavity 2a is formed on the metallic mold body 2 such that it surrounds the cavity 2a, and is connected to a vacuum pump (not shown) serving as a suction apparatus. A cooling water jacket or cooling water hole serving as a cooling water path 3a for cooling the metallic mold body 2 is formed on the cooling member 3 and connected to a cooling water pump (not shown). It is to be noted that, while, in the embodiment described above, a porous material as a ventilation member is used for the metallic mold body 2, alternatively a large number of holes of a small diameter or elongated slits of a small width may be worked on the surface of the cavity.

Next, a simultaneous filling step by the simultaneous filling blow molding apparatus described above is described with reference to FIG. 5 and FIGS. 9a to 9f.

The metallic mold 1 stands by at the filling position B in a condition wherein it is opened by the mold clamping apparatus 34. This position of the metallic mold 1 is detected by the rotary encoder 26. A molten resin supplied from the extruder 22 to the cross head 23 is extruded downwardly as a tubular parison 24 from the cross head 23.

Figure 9A:
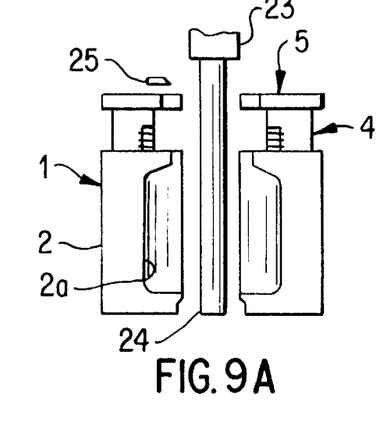
FIG. 9a is a view showing a parison extruded between the metallic mold.

(a) In a condition wherein a predetermined Length of the parison 24 is extruded from the cross head 23, the AC servomotor 27 of the metallic mold feeding apparatus 33 is driven to rotate in the advancing direction. Consequently, the ball screw 29 is rotated via the coupling 28, and this rotational movement is converted into a linear movement by the ball nut 30 which is held in meshing engagement with the ball screw 29. In particular, the ball nut 30 is advanced in the leftward direction in FIG. 5, and the connection member 31, metallic mold feeding apparatus 33, mold clamping apparatus 34 and metallic mold 1 which are integrated with the ball nut 30 are advanced from the filling position B to the parison receiving position A. It is to be noted that the location above the metallic mold 1 is normally covered with germ-free air of the class 100 or less. The class 100 signifies a condition wherein less than 100 fine particles of 0.5 μm or more are included in air of 1 cubit feet.

Figure 9B:
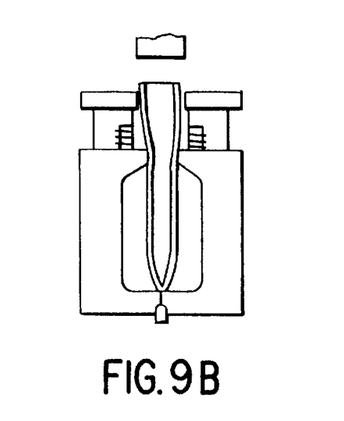
FIG. 9b is a view showing the metallic mold body in a closed condition.

(b) The parison 24 extruded from the cross head 23 is held between the two components of the metallic mold body 2 and a lower end of the parison 24 is pressed into a sealed condition, and then an upper portion of the parison 24 is cut by the parison cutting apparatus 25. Since the parison 24 is not held in close contact with the face of the cavity 2a of the metallic mold body 2 being cooled, the temperature of the resin is higher than 120° C. at the lowest and a sufficient sterilization effect is achieved.

Figure 9C:
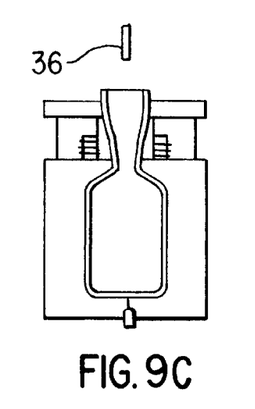
FIG. 9c is a view showing the parison in an expanded condition.

(c) The AC servomotor 27 for the metallic mold feeding apparatus 33 is driven to rotate in the retracting direction so that the metallic mold 1 holding the parison 24 which is open at the top thereof is fed from the parison receiving position A to the filling position B. During the movement, the parison 24 is sucked by vacuum to the face of the cavity 2a of the metallic mold body 2 so that a hollow article of a predetermined shape is molded. Further, an upper portion of the parison 24 is closely contacted with the parison sucking plate 5. During feeding and vacuum suction of the metallic mold 1, since the location above the metallic mold 1 is in a clean air atmosphere, germs or foreign substances are not admitted into the inside of the vessel.

Figure 9D:
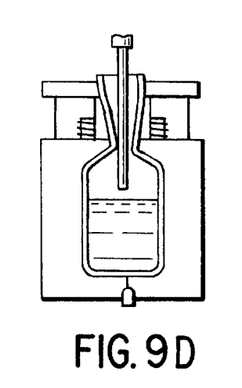
FIG. 9d is a view showing a molded article in which fluid is being filled.

(d) The filling nozzle 36 is moved down and inserted into the hollow article, and liquid is filled into the hollow article. The molded article filled with the liquid is cooled from the outer face thereof by the metallic mold 1 and from the inner face thereof by the filled liquid.

Figure 9E:
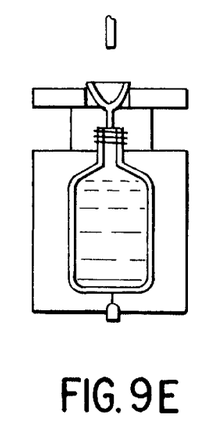
FIG. 9e is a view showing a pressure sealing metallic mold in a closed condition.

(e) The filling nozzle 36 is moved up and the pressure sealing metallic mold 4 is closed to seal the opening of the molded article filled with the liquid. Then, the upper portion of the parison 24 is released from the parison sucking plate 5.

Figure 9F:
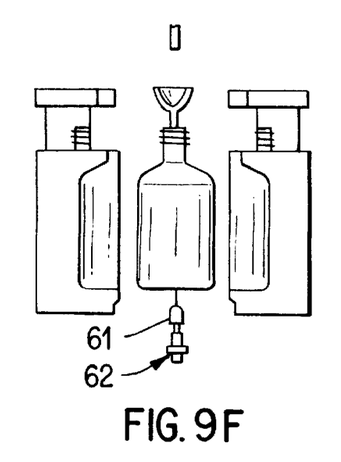
FIG. 9f is a view showing the metallic mold in an opened condition.

(f) The support pins 61 of the molded article supporting apparatus 62 provided below the metallic mold 1 are moved up and inserted into a location below the molded article to support the the molded article thereon, and then the metallic mold 1 is opened.

In the steps a to d described above, air present in the inside of the parison 24 is heated and sterilized by the temperature (higher than 120° C. at the lowest) of the parison. Further, since the air in the inside of the parison 24 is expanded by the heat and flows out to the outside because it is higher in temperature than the external air, foreign substances or polluted air is not sucked into the parison 24 at all.

Then, as seen in FIG. 5, when the metallic mold 1 opened as described above moves to the parison receiving position A in order to hold the parison 24 extruded from the cross head 23, the molded article holding apparatus 63 mounted on the right side of the mold clamping apparatus 34 in FIG. 5 is moved to the filling position B, at which it holds the molded article. Then, when the metallic mold 1 holding the parison 24 thereon is moved to the filling position B, the molded article holding apparatus 63 is moved to the molded article discharging position C. Since the inclined movable chute 66 which is moved back and forth by the electric motor 65 is provided below the molded article holding apparatus 63 at the molded article discharging position C, when the molded article is to be dropped, the movable chute 66 is moved to the location below the molded article holding apparatus 63 to receive the molded article, and the molded article is carried out to the outside of the machine by the belt conveyor 67 provided at the lower location on the right side of the movable chute 66. Further, when burrs are to be dropped, the movable chute 66 is moved from the location below the molded article holding apparatus 63, and the burrs are received on the belt conveyor 68 provided below the molded article holding apparatus 63 and then carried out to the outside of the machine.

(Embodiment 2)

Figure 10:
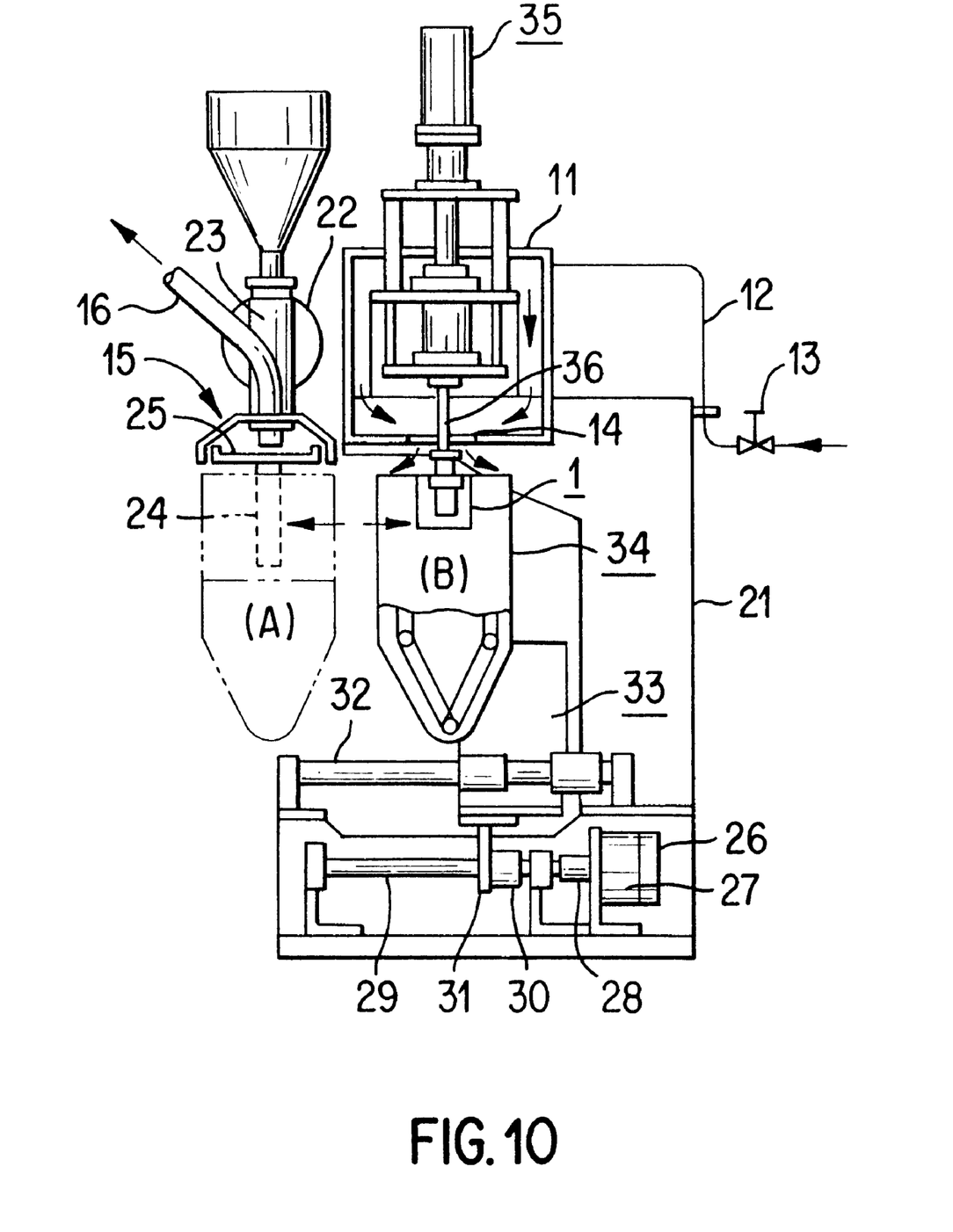
FIG. 10 is a schematic view showing a second embodiment of a simultaneous filling blow molding apparatus of the present invention.

FIG. 10 is a general schematic view showing a second embodiment of a simultaneous filling blow molding apparatus of the present invention. As seen from FIG. 10, in the present embodiment, a filling nozzle 36 is constructed so that it can be accommodated into a clean air box 11 and an upper portion of an electrothermal hot cutter 25 of a parison cutting apparatus is covered with an exhaust air hood 15. Since the other construction is substantially similar to that of the first embodiment, description thereof is omitted here.

As seen in FIG. 10, the filling nozzle 36 can be accommodated into the clean air box 11. In particular, the filling nozzle 36 projects, when it is moved down, from the clean air box 11, but is accommodated into the clean air box 11 when it is moved up. A clean air pipe 12 is connected to the clean air box 11 so that clean air is supplied to the clean air box 11 via a flow rate control valve 13. Since the filling nozzle 36 is accommodated in the clean air box 11 except during filling as described above, germs or foreign substances do not stick to the filling nozzle 36 at all. Further, jetting holes 14, including a hole through which the filling nozzle 36 moves up and down, for jetting clean air therethrough are formed in a lower wall of the clean air box 11.

Figure 11:
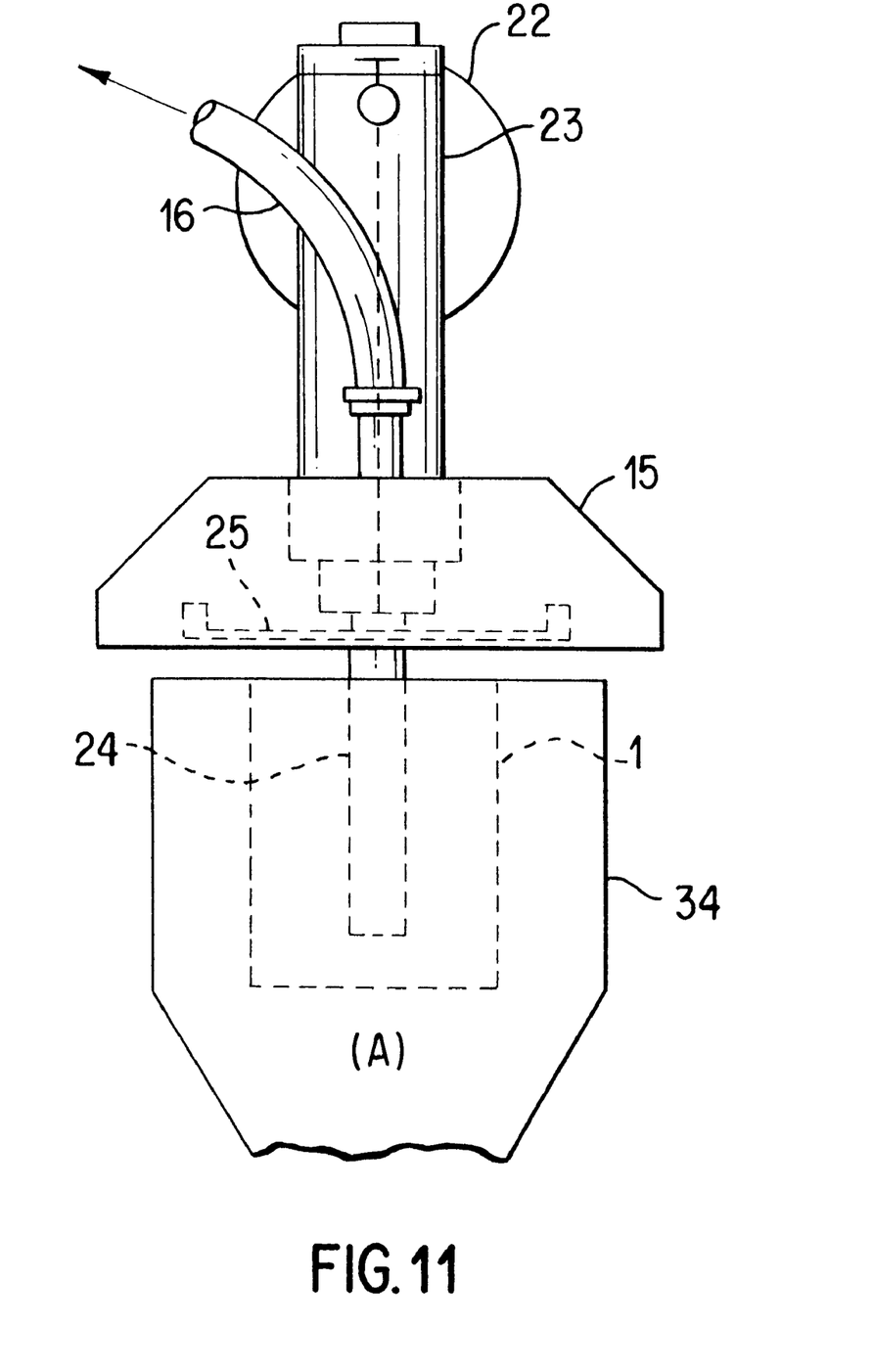
FIG. 11 is a schematic view of an exhaust air hood.
Figure 12:
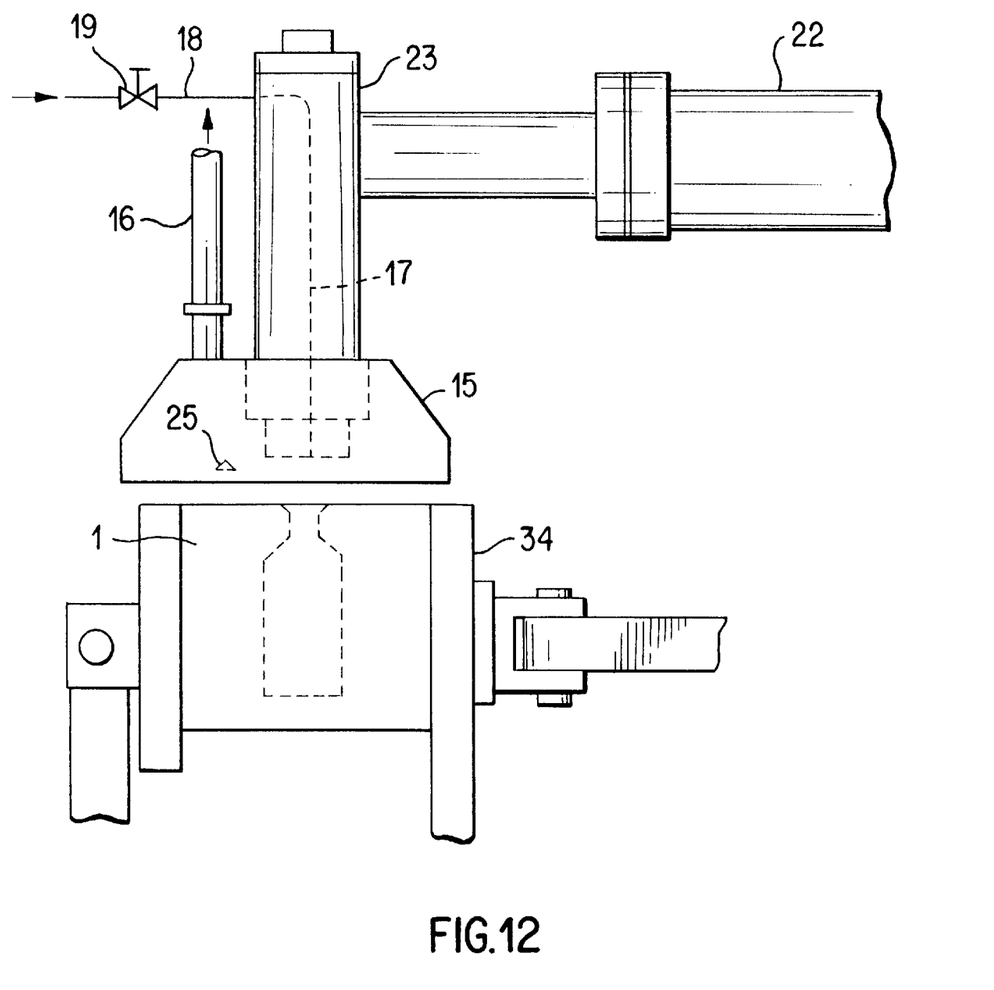
FIG. 12 is a side elevational view of the exhaust air hood of FIG. 11.

FIG. 11 is a schematic view of the exhaust air hood, and FIG. 12 is a side elevational view of the exhaust air hood.

As seen in FIGS. 11 and 12, an upper portion of the electrothermal hot cutter 25 provided between the metallic mold 1 at the parison receiving position A and the cross head 23 is covered with the exhaust air hood 15, and an air sucking pipe 16 which is communicated with a blower or the like is connected to an upper portion of the exhaust air hood 15.

Next, the function of the exhaust air hood 15 is described. In particular, when a parison 24 is to be cut by the electrothermal hot cutter 25, the parison 24, that is, the plastic, is melted by the heated cutter 25, and volatile gases and/or carbonized fine particles of the plastic are scattered into the air, admitted into the inside of the parison 24 and sticks to or is dissolved into liquid, which is filled in a later step, to pollute the filled liquid. Therefore, immediately after the parison 24 is cut, those volatile gases and carbonized fine particles are sucked by the exhaust air hood 15 provided above the electrothermal hot cutter 25 and discharged to another location, for example, to the outside of the clean room via the air sucking pipe 16.

As shown in FIG. 12, an inlet hole 17 for clean air is formed through a central portion of the cross head 23, and a clean air pipe 18 is connected to the top end of the inlet hole 17. Clean air supplied into the inlet hole 17 via a flow rate control valve 19 provided for the clean air pipe 18 is filled into the parison 24 from the lower end of the inlet hole 17.

Next, a simultaneous filling blow molding process by the simultaneous filling blow molding apparatus described above is described with reference to FIGS. 13a to 13f.

Figure 13A:
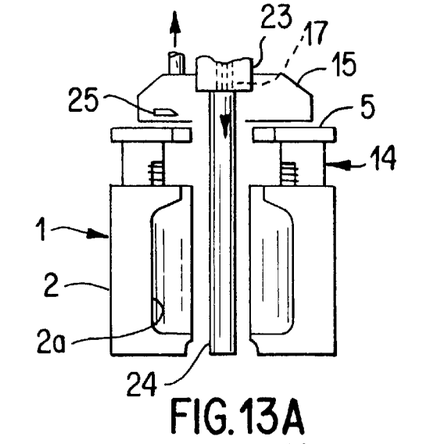
FIG. 13a is a view showing a parison extruded between a metallic mold.

(a) A cylindrical parison 24 is extruded from the cross head 23 into the metallic mold 1. Upon extrusion of the parison 24, in order to keep the parison 24 in a cylindrical shape, germ-free clean air of the class 100 or less at the lowest is filled by a small amount into the parison 24 through the inlet hole 17 provided at the central portion of the cross head 23.

Figure 13B:
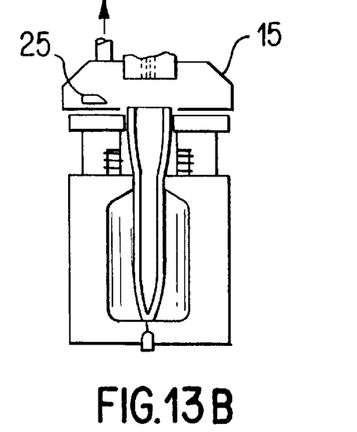
FIG. 13b is a view showing the metallic mold body in a closed condition.

(b) The parison 24 extruded from the cross head 23 is held between the two components of the metallic mold body 2 and a lower end of the parison 24 is pressed into a sealed condition, and then an upper portion of the parison 24 is cut by the electrothermal hot cutter 25 serving as a parison cutting apparatus. Thereupon, air filled in the parison 24 flows out to the outside through the cut portion of the parison 24. Since the parison 24 is not held in close contact with the face of the face of the cavity 2a of the metallic mold body 2 being cooled, the temperature of the resin is higher than 120° C. at the lowest and a sufficient sterilization effect is achieved.

Volatile gases and/or carbonized fine particles of the plastic produced when the parison 24 is cut by the electrothermal hot cutter 25 are sucked by the exhaust air hood 15 provided above the electrothermal hot; cutter 25 and discharged to the outside of the clean room. The suction by the exhaust air hood 15 is performed always or immediately after the parison 24 is cut.

Figure 13C:
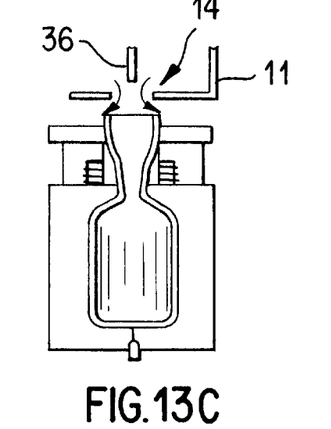
FIG. 13c is a view showing a parison in an expanded condition.

(c) The metallic mold 1 holding the parison 24 which is open at the top thereof is fed from the parison receiving position A to the filling position B. During the movement, the parison 24 is sucked by vacuum to the face of the cavity 2a of the metallic mold body 2 so that a hollow article of a predetermined shape is molded.

Figure 13D:
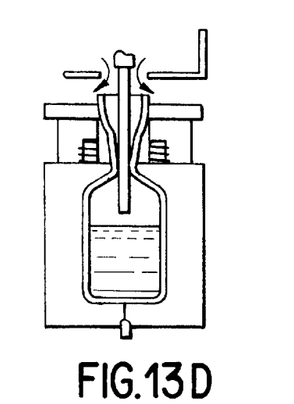
FIG. 13d is a view showing a molded article in which liquid is being filled.

(d) The filling nozzle 36 accommodated in the clean air box 11 is moved down and inserted into the hollow article, and liquid is filled into the hollow article. The molded article filled with the liquid is cooled from the outer face thereof by the metallic mold 1 and from the inner face thereof by the filled liquid.

Figure 13E:
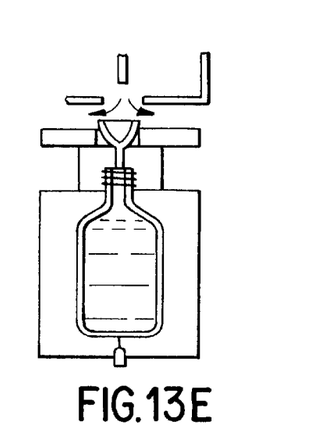
FIG. 13e is a view showing a pressure sealing metallic mold in a closed condition.

(e) The filling nozzle 36 is moved up and accommodated into the clean air box 11, and the pressure sealing metallic mold 4 is closed so that the opening of the molded article filled with the liquid is sealed. It is to be noted that, in the steps described above, since the atmosphere above the metallic mold 1 is such that clean air continuously supplied into the clean air box 11 flows out from jetting holes 14 and covers over the opening of the parison 24, there is no possibility at all that germs or foreign substances may be admitted into the parison 24.

Figure 13F:
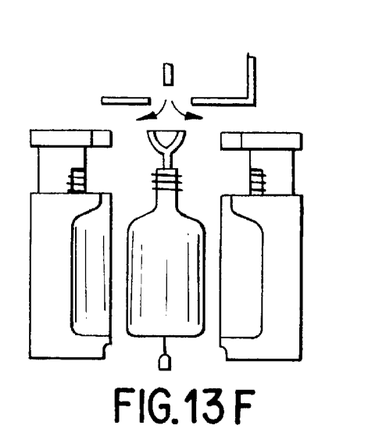
FIG. 13f is a view showing the metallic mold in an opened condition.

(f) The metallic mold 1 is opened, and the molded article is dropped from the metallic mold 1 or held by the molded article holding apparatus 63 and transported to a next step.

While, in the first and second embodiments described above, a parison 24 is sucked by vacuum to the face of the cavity 2a of the metallic mold body 2 to mold a hollow article, clean air may alternatively be blown into the inside of the parison 24 to mold a hollow article. Further, while, in the second embodiment, a small amount of clean air is filled into the parison 24 in order to hold the parison 24 in a cylindrical shape when the parison 24 is to be extruded, clean air need not be inserted into the parison 24 depending upon the characteristic or the condition of the parison 24. Further, while the parison cutter of the parison cutting apparatus is formed as the electrothermal hot cutter 25 and the upper portion of the electrothermal hot cutter 25 is covered with the exhaust air hood 15, where a cold cutter is used for the parison cutter instead, the exhaust air hood 15 is not required.

(Embodiment 3)

A liquid filling apparatus 90 of a simultaneous filling blow molding apparatus is described in detail with reference to FIG. 14.

Figure 14:
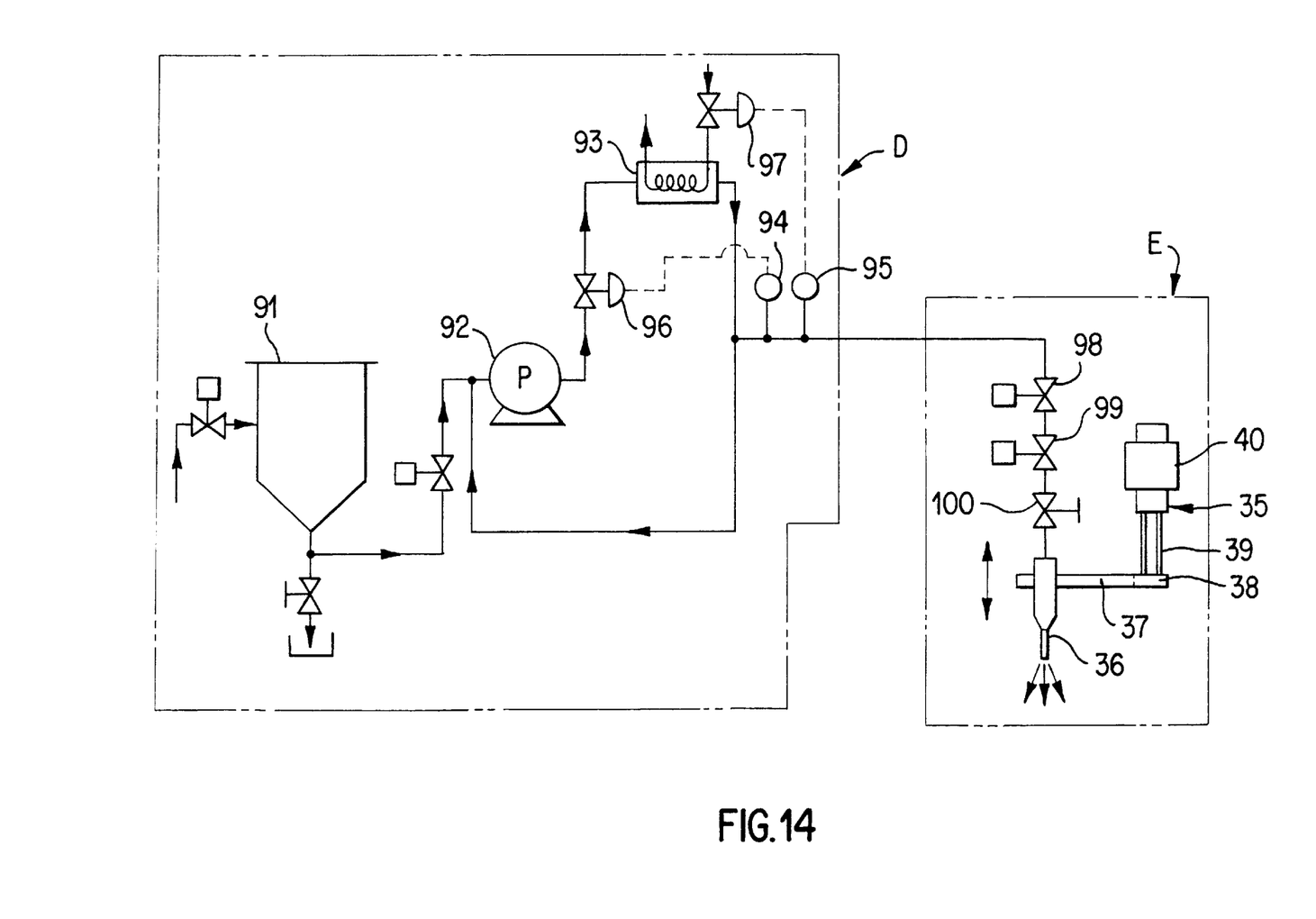
FIG. 14 is a schematic view showing a third embodiment of a simultaneous filling blow molding apparatus of the present invention.

As seen in FIG. 14, the liquid filling apparatus 90 is composed of a liquid pressure feeding system D and a liquid filling system E. The liquid pressure feeding system D includes a liquid storage tank 91, a pump 92, and a heat exchanger 93, which are connected in series by means of a pipe line. The pipe line from the heat exchanger 93 is branched into two pipe lines. One of the pipe lines is connected to the liquid filling system E, and a pressure gage 94 and a thermometer 95 are attached to the connection pipe line. The other pipe Line is connected to the suction side of the pump 92.

The pressure gage 94 is connected to a diaphragm valve 96 interposed in the pipe line between the pump 92 and the heat exchanger 93. The thermometer 95 is connected to another diaphragm valve 97 provided on the entrance side of a pipe for cooling water or a heating medium for the heat exchanger 93.

The liquid filling system E includes a fixed amount filling solenoid valve 98, a drop preventing solenoid valve 99 and a throttle valve 100, which are connected in series by means of a pipe line. It is to be noted that the fixed amount filling solenoid valve 98 is connected to a connection circuit to the liquid pressure feeding system D, and the throttle valve 100 is connected to the filling nozzle 36 via a pipe line.

The fixed amount filling solenoid valve 98 allows filling of a fixed amount of liquid by means of a timer provided for the solenoid valve 98. The timer can be set with and store a numerical value. Further, since the solenoid valve 98 used has a high responsibility, a high degree of accuracy of filling can be obtained repetitively.

Figure 15:
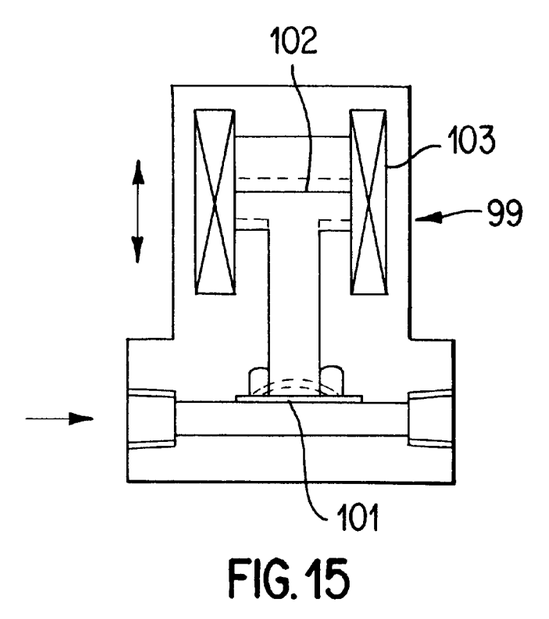
FIG. 15 is a schematic sectional view showing a drop preventing solenoid valve.

As shown in FIG. 15, the drop preventing solenoid valve 99 includes bellows 101 provided on a side face of the pipe line of the drop preventing solenoid valve 99 and having a curved face portion, an iron core 102 for pressing the curved face portion of the bellows 101, and a coil 103 for operating the iron core 102.

Figure 16A:
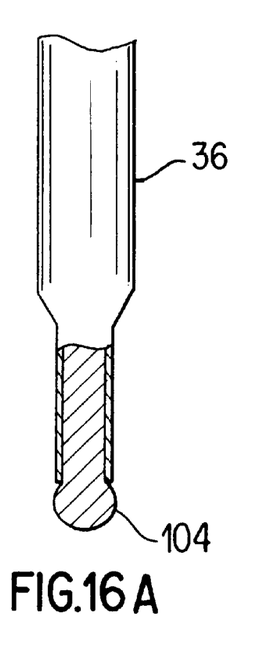
FIG. 16a is a view illustrating a condition of a liquid drop at an end of a filling nozzle.
Figure 16B:
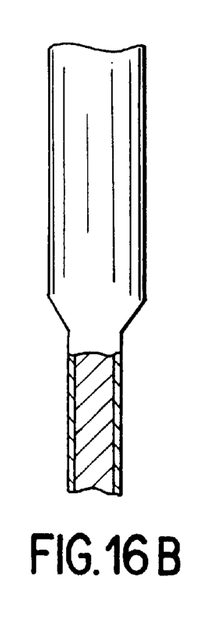
FIG. 16b is a view illustrating a condition wherein the liquid drop at the end of the filling nozzle is absorbed.

The curved face portion of the bellows 101 is normally pressed by the weight of the iron core 102 or a spring (not shown) so that it exhibits a condition of a flat face, but if the coil 103 is energized, then the iron core 102 is moved upwardly to put the curved face portion of the bellows 101 into a curved face condition as indicated by an imaginary line to increase the volume of the pipe line of the drop preventing solenoid valve 99 to suck a liquid drop 104 at the end of the filling nozzle 36 immediately after filling as shown in FIG. 16a into the filling nozzle 36 as shown in FIG. 16b.

The throttle valve 100 is principally used to enable or disable supply of liquid to the filling nozzle 36.

As shown in FIG. 14, the filling nozzle 36 of the filling nozzle lifting apparatus 35 is moved down, when filling is to be performed, to insert the end thereof into a hollow article and is then pulled up after the filling is completed, by rotating a ball screw 39 held in meshing engagement with a ball nut 38 of a nozzle supporting plate 37 by means of a motor 40.

Next, operation of the liquid filling apparatus described above is described with reference to FIG. 14.

In the liquid pressure feeding system D, liquid of the liquid storage tank 91 is fed into the heat exchanger 93 by the pump 92. The liquid is controlled to a fixed temperature (an arbitrary temperature within the range of approximately 20 to 25° C.) by the heat exchanger 93 so that it has a fixed viscosity, and then it is returned to the entrance of the pump 92 so that it is thereafter circulated. It is to be noted that the temperature of the liquid is detected by the thermometer 95 provided for the connection pipe line between the liquid pressure feeding system D and the liquid filling system E and a diaphragm valve 97 provided on the entrance side of the pipe line for the cooling water or heating medium of the heat exchanger 93 is controlled based on the detected temperature of the liquid to keep the temperature of the liquid to the fixed temperature. The pressure of the liquid is detected by the pressure gage 94 provided for the connection pipe line between the liquid pressure feeding system D and the liquid filling system E and the diaphragm valve 96 provided for the pipe line between the pump 92 and the heat exchanger 93 is controlled based on the detected pressure of the liquid to keep the pressure of the liquid to a fixed pressure (an arbitrary pressure within the range of 0.1 to 2 kgf/cm²). The liquid kept to the fixed temperature and the fixed pressure by the liquid pressure feeding system D is filled, when the fixed amount filling solenoid valve 98 of the liquid filling system E is opened, into the inside of a hollow article from the filling nozzle 36 by a fixed amount defined by the timer provided for the solenoid valve 98. Further, since the solenoid valve 98 has a high responsibility (the responsibility is 5 to 10 ms), a high degree of accuracy of filling can be achieved.

For example, in order to fill liquid by 5 ml or less, filling is performed with a filling pressure of 1 kgf/cm² or less, a filling tolerance of 5 ml ±3% or less, a filling nozzle diameter of 2 mm or less and a filling time of 2 sec or less.

If the fixed amount filling solenoid valve 98 is closed to end the filling, then the drop preventing solenoid valve 99 is energized to increase the volume of the flow path of the valve 99 to suck a liquid drop 104 at the end of the filling nozzle 36 immediately after the filling into the filling nozzle 36. By the suction of the liquid drop 104, it can be prevented that the liquid drop 104 sticking to the end of the filling nozzle 36 drops into the molded article by vibrations or the like when the filling nozzle 36 is moved up. This effect is particularly significant where the filling amount is small, and a dispersion in filling amount can be prevented.

Since the present invention is constructed in such a manner as described above, the following effects are exhibited.

(a) Since the simultaneous filling blow molding apparatus has a characteristic of an electrically driven blow molding apparatus, prevention of pollution to and elimination of germs from a molded particle can be anticipated. In particular, since the driving mechanism for the filling nozzle lifting apparatus and the driving mechanisms for the mold clamping apparatus, mold feeding apparatus and parison cutting apparatus which are located above the metallic mold are not driven hydraulically but electrically, pollution to a molded article arising from leakage of the hydraulic operating liquid or from oil mist is prevented.

(b) Since the location above the metallic mold which is moved between the parison receiving position and the filling position is covered with clean air, germs or foreign substances are prevented from entering the parison through an opening (cut portion) of the parison like.

(c) Where expansion of a parison is performed by vacuum suction, elimination of germs is easy comparing with an alternative case wherein such expansion is performed by blowing in of air.

(d) Where the filling nozzle is constructed such that it can be accommodated into the clean air box, since the filling nozzle is accommodated in the clean air box except during filling, germs or foreign substances are prevented from sticking to the filling nozzle.

(e) Where the location above the electrothermal hot cutter is covered with the exhaust air hood, volatile gases and/or carbonized fine particles produced when a parison is cut by the electrothermal hot cutter are sucked by the exhaust air hood and discharged to the outside of the clean room, and consequently, the inside of the parison is prevented from being polluted at all.

(f) Since the liquid filling apparatus is connected by a pipe and the solenoid valves and other components are simplified in flow path structure and include no staying location, they can be cleaned and sterilized readily. Further, since the solenoid valves of a high responsibility and the drop preventing solenoid valve are used, a filling amount with a high degree of accuracy can be obtained repetitively.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A simultaneous filling blow molding apparatus, comprising:

a cross head mounted at an end of an extruder for extruding a parison between a pair of elements of a metallic mold;

a filling nozzle lifting apparatus lifting a filling nozzle provided in parallel to said cross head;

a clean air box for accommodating said filling nozzle, means for maintaining the clean air box at a positive pressure;

a metallic mold feeding apparatus for moving a mold clamping apparatus for opening and closing said metallic mold between a parison receiving position and a filling position;

a parison cutting apparatus for cutting the parison above said metallic mold; and a liquid filling apparatus connected to said filling nozzle, comprising a liquid pressure feeding system for controlling the liquid to a fixed temperature and a fixed pressure and a liquid filling system provided with a fixed amount filling solenoid valve and a drop prevent solenoid valve in series for filling the liquid into a molded article;

wherein said drop prevent solenoid valve includes a flexible bellows attached to said passage and a solenoid core communicating with said bellows, said solenoid core configured to deform said bellows when said solenoid valve is energized;

wherein said mold clamping apparatus, metallic mold feeding apparatus, filling nozzle lifting apparatus and parison cutting apparatus are electrically driven.

2. A simultaneous filling blow molding apparatus as set forth in claim 1, wherein said liquid pressure feeding system comprises a pump and a heat exchanger in series, a diaphragm valve provided on the pipe line of said heat exchange for controller the temperature of the liquid based on the detected temperature, and a diaphragm valve provided between said pump and said heat exchanger for controlling the pressure of the liquid based on the detected pressure.

3. A simultaneous filling blow molding apparatus as set forth in claim 1, wherein said metallic mold has a ventilation structure, through which air in said metallic mold is sucked by vacuum to expand the parison.

4. A simultaneous filling blow molding apparatus as set forth in claim 1, wherein a parison cutter of a parison Cutting apparatus for cutting the parison above said metallic mold is an electro-thermal hot cutter, and an exhaust air hood for sucking polluted air produced when the parison is cut is provided above said cutter.

5. A simultaneous filling blow molding apparatus as set forth in claim 1, wherein said drop prevent solenoid valve is configured to expand a volume of a passage between said fixed amount filling solenoid valve and said filling nozzle, after said fixed amount filling solenoid valve has cut off a liquid supply to said filling nozzle.

\* \* \* \* \*